United States Patent Office 3,346,633
Patented Oct. 10, 1967

3,346,633
N,N'-(2-HYDROXYTRIMETHYLENE)BIS [o-(HY-DROXYMETHYL)-BENZENESULFONAMIDE]
John Shavel, Jr., Mendham, and Harold Zinnes, Rockaway, N.J., assignors to Warner-Lambert Pharmaceutical Company, Morris Plains, N.J., a corporation of Delaware
No Drawing. Filed Apr. 19, 1966, Ser. No. 543,538
2 Claims. (Cl. 260—556)

This is a continuation-in-part application of our co-pending application Ser. No. 365,139 filed May 5, 1964 and now abandoned.

This invention relates to N,N'-(2-hydroxytrimethylene)-bis [o-(hydroxymethyl)-benzenesulfonamide] which may be represented by the following structural formula:

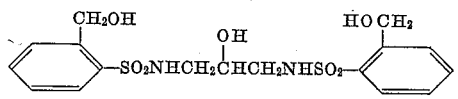

The above compound is useful as a central nervous system stimulant in mammals such as mice. In order to use the compounds of this invention they are combined with an inert pharmaceutical diluent to from dosage forms such as tablets or solutions. Generally a dose of about 1 to 100 mg. orally may be used to produce the desired stimulant effects. In addition, it is useful as an intermediate for the synthesis of other 1,3-disubstituted propanes.

According to the process of this invention, this compound is prepared by reacting 2,2'-(2-oxotrimethylene)-disaccharin with complex alkali metal hydrides such as sodium or potassium borohydride in a solvent consisting of a mixture of dichloromethane or dichloroethane and an alcohol, such as methanol, employing ambient temperature such as 25°–30° C. The reaction product may be recovered by extraction of the reaction mixture with a solvent such as dichloromethane, chloroform, or ether. The reaction product is generally obtained as a crystalline product which may be purified by recrystallization from methanol. The starting material used in the above reaction is prepared by reacting sodium saccharin with 1,3-dichloro-2-propanone in dimethylformamide at a temperature of about 100°–110° C. for about 30 min.

The foregoing reaction may be represented by the equation:

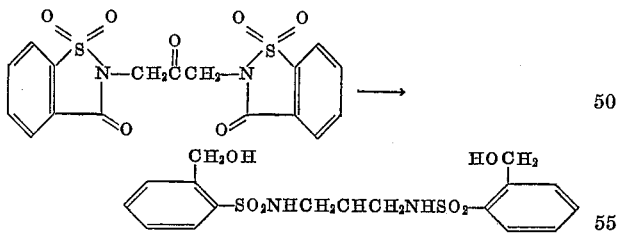

The following example is given in order to further illustrate the practice of the present invention.

EXAMPLE

N,N'-(2-hydroxytrimethylene)bis [o-hydroxymethyl)-benzenesulfonamide]

A mixture of 14.7 g. of 2,2'-(2-oxotrimethylene)disaccharin, 10 g. of sodium borohydride, 300 ml. of dichloromethane, and 300 ml. of ethanol is stirred at 25°–30° C. for six hours. Most of the solvent is removed by distillation in vacuo, the residue is treated with 300 ml. of water, and the mixture is made strongly acidic by the addition of dilute hydrochloric acid. Extraction with dichloromethane followed by evaporation of the solvent gives an oily residue which crystallizes on trituration with methanol. Recrystallization from methanol gives 10.2 g. of N,N' - (2 - hydroxytrimethylene)bis [o-(hydroxymethyl)-benzenesulfonamide], M.P. 142–143°;

$\lambda_{max.}^{Nujol}$ 3480, 3330 cm.$^{-1}$

Analysis for $C_{17}H_{22}N_2O_7S_2$.—Calcd: C, 47.43; H, 5.15; N, 6.51; S, 14.90. Found: C, 47.34; H, 5.15; N, 6.49; S, 15.24.

It is to be understood that the foregoing detailed description is given merely by way of illustration and that many variations may be made therein without departing from the spirit of our invention.

Having described our invention, what we desire to secure by Letters Patent is:

1. N,N'-(2 - hydroxytrimethylene)bis [o - (hydroxymethyl)-benzenesulfonamide].
2. Process for the production of N,N'-(2-hydroxytrimethylene)bis [o-(hydroxymethyl)-benzenesulfonamide] which comprises contacting 2,2'-(2-oxotrimethylene)disaccharin with sodium borohydride or potassium borohydride at a temperature of 25°–30° C. in a solvent consisting of a mixture of dichloromethane or dichloroethane and a lower alkyl alcohol.

References Cited
FOREIGN PATENTS
500,033    1/1939    Great Britain.

WALTER A. MODANCE, Primary Examiner.
H. MOATZ, Assistant Examiner.